(12) United States Patent
Kamimae et al.

(10) Patent No.: US 8,740,288 B2
(45) Date of Patent: Jun. 3, 2014

(54) CAB

(75) Inventors: Takeshi Kamimae, Kanazawa (JP); Takeshi Esaki, Komatsu (JP); Keisuke Kubota, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/634,095

(22) PCT Filed: Jul. 6, 2012

(86) PCT No.: PCT/JP2012/067305
§ 371 (c)(1),
(2), (4) Date: Sep. 11, 2012

(87) PCT Pub. No.: WO2013/145347
PCT Pub. Date: Oct. 3, 2013

(65) Prior Publication Data
US 2013/0257099 A1    Oct. 3, 2013

(30) Foreign Application Priority Data

Mar. 30, 2012    (JP) .................................. 2012-080017

(51) Int. Cl.
*B62D 33/06*    (2006.01)
*B60H 1/26*    (2006.01)
*B60H 1/00*    (2006.01)

(52) U.S. Cl.
CPC ........ *B60H 1/00378* (2013.01); *B62D 33/0617* (2013.01)
USPC .................. 296/190.09; 296/193.07; 454/162

(58) Field of Classification Search
USPC ............. 296/190.01, 190.08, 190.09, 193.07, 296/208; 454/70, 144, 162, 164, 165, 340, 454/367
See application file for complete search history.

(56) References Cited

U.S. PATENT DOCUMENTS

| | | | |
|---|---|---|---|
| 2,484,685 A | 10/1949 | Burdick et al. | |
| 5,273,340 A | 12/1993 | Nelson et al. | |
| 6,866,576 B2 * | 3/2005 | Quinn et al. | 454/162 |
| 2008/0023261 A1 | 1/2008 | Kaneko et al. | |

FOREIGN PATENT DOCUMENTS

| | | |
|---|---|---|
| DE | 10 2005 010179 A1 | 9/2006 |
| EP | 2 138 383 A1 | 12/2009 |
| JP | 61191732 A  * | 8/1986 |
| JP | 61-163714 U | 10/1986 |
| JP | 3-029557 U | 3/1991 |
| JP | 10-245871 A | 9/1998 |
| JP | 2004-183230 A | 7/2004 |
| JP | 2005-331766 A | 12/2005 |
| JP | 2007-154444 | 6/2007 |
| JP | 2007-231520 | 9/2007 |
| JP | 2009-120046 A | 6/2009 |
| WO | WO 2013/125059 A1 | 8/2013 |

* cited by examiner

*Primary Examiner* — Glenn Dayoan
*Assistant Examiner* — Jason S Daniels
(74) *Attorney, Agent, or Firm* — Drinker Biddle & Reath LLP (57) ABSTRACT

A cab includes a driver's seat for an operator to sit and an air conditioner in its internal space. A floor plate forming the floor includes a tapered portion on a front side with respect to an operator sitting on the driver's seat and a rectangular portion on a rear side with respect to the operator as seen in a plan view, and the tapered portion is in a tapered trapezoidal shape having two parallel sides and a dimension in a width direction decreasing frontward. A through hole is formed in the floor plate of a region of the tapered portion and connects the internal space of the cab and an external space of the cab to each other. Accordingly, the pressure in the cab can effectively be reduced.

4 Claims, 9 Drawing Sheets

CAB

TECHNICAL FIELD

The present invention relates to a cab.

BACKGROUND ART

In general, construction machinery such as wheel loader is equipped with a cab which is a space for an operator to operate the construction machinery. The cab is usually formed by being enclosed by windows, walls, and the like, and the inside of the cab is designed to have reduced noise.

An example of the cab is disclosed for example in Japanese Patent Laying-Open No. 2007-154444 (PTL 1). In the cab disclosed in Japanese Patent Laying-Open No. 2007-154444, the cab's air tightness is enhanced for reducing noise. In addition, the cab has an air conditioner in the cab, and therefore the inside of the cab is kept comfortable.

CITATION LIST

Patent Literature

PTL 1: Japanese Patent Laying-Open No. 2007-154444

SUMMARY OF INVENTION

Technical Problem

As for the cab disclosed in Japanese Patent Laying-Open No. 2007-154444, however, the airtightness of the cab is so high that the operator feels discomfort like ear popping caused by an increase of the internal pressure which is caused when the door of the cab is closed.

The present invention has been made in view of the problem above, and an object of the present invention is to provide a cab for which the pressure inside the cab can effectively be reduced.

Solution to Problem

A cab according to the present invention includes a driver's seat for an operator to sit and an air conditioner in an internal space of the cab. A floor plate forming a floor includes a tapered portion on a front side with respect to an operator sitting on the driver's seat and a rectangular portion on a rear side with respect to the operator as seen in a plan view, and the tapered portion is in a tapered trapezoidal shape having two parallel sides and a dimension in a width direction decreasing frontward. A through hole is formed in the floor plate of a region of the tapered portion and connecting the internal space of the cab and an external space of the cab to each other.

Regarding the cab according to the present invention, the through hole is formed in the floor plate of a region of the tapered portion of the cab for connecting the internal space and the external space of the cab to each other. In the tapered portion of the cab, pressure is considered as being likely to concentrate. Since the through hole is formed in the floor plate of a region of the tapered portion, the pressurized air in the internal space of the cab can effectively be released to the external space of the cab. The pressure in the cab can therefore be reduced effectively.

The cab is formed so that a dimension in a height direction decreases frontward as seen in a side view. The through hole is formed in the floor plate of a region of the tapered portion. In the portion whose dimension in the height direction decreases toward the front with respect to the driver's seat, the pressure is considered as being likely to concentrate. The through hole is formed in the floor plate of this portion to thereby enable the pressure in the cab to be reduced more effectively.

In the cab, a cab component is disposed in the internal space of the cab and at a position opposite to the through hole. A support member is provided to support the cab component so that a gap is generated between the cab component and the floor plate.

Regarding the cab, the gap is generated between the cab component and the floor plate and the cab component is disposed at a position opposite to the through hole. In this gap, pressure is considered as being likely to concentrate. Since the through hole is formed opposite to the gap, the pressure in the cab can more effectively be reduced.

In the cab, the cab component may be the air conditioner.

In the cab, an area of an opening of the through hole that opens to the internal space of the cab is equal to or larger than an area of an entrance of the gap that is surrounded by the air conditioner, the support member, and the floor plate.

In the case where the area of the opening is equal to or larger than the area of the entrance of the gap, the flow rate of the air discharged through the opening into the outside of the cab is higher than the flow rate of the air flowing through the entrance into the gap. Thus, the air in the cab can effectively be discharged to the outside of the cab without pressure loss.

In the cab, the through hole includes a plurality of slits. Accordingly, the total area of the openings can be increased without significantly weakening the strength of the floor plate.

The cab further includes a cover member disposed in the external space of the cab and at a position opposite to the through hole. Accordingly, intrusion of noise outside the cab into the cab as well as intrusion of water and dust into the cab can be suppressed.

For the cab, the cover member includes a cover and an acoustic member provided between the cover and the through hole. Accordingly, further reduction of noise inside the cab can be achieved.

Advantageous Effects of Invention

As seen from the description above, the present invention can effectively reduce the pressure inside the cab.

DESCRIPTION OF EMBODIMENTS

In the following, an embodiment of the present invention will be described based on the drawings.

First, a configuration of a wheel loader according to an embodiment of the present invention will be described with reference to FIG. 1.

Figure 1:
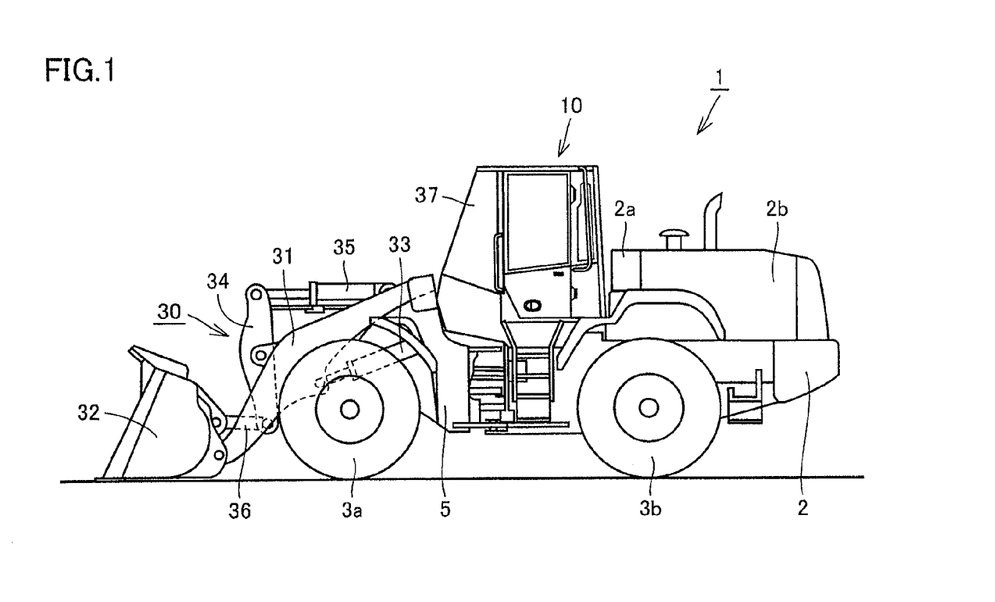
FIG. 1 is a side view schematically illustrating a configuration of a wheel loader according to an embodiment of the present invention.

Referring to FIG. 1, wheel loader 1 of the present embodiment mainly includes a rear body 2, a front frame 5, and an operating machine 30. To each lateral side of front frame 5, a front wheel 3a is attached. To each lateral side of rear body 2, a rear wheel 3b is attached.

Rear body 2 and front frame 5 are attached to each other by a center pin (not shown) in such a manner that allows them to laterally swing relative to each other, and thus form an articulated structure. Specifically, rear body 2 and front frame 5 are coupled together by a pair of right and left steering cylinders (not shown). The right and left steering cylinders are extended and shortened to allow rear body 2 and frame 5 to laterally swing relative to each other about the center pin and steer. These rear body 2 and front frame 5 constitute the body of wheel loader 1.

To the front side of front frame 5, operating machine 30 is attached. Operating machine 30 includes a boom 31 having its base end attached to front frame 5 in such a manner that allows boom 31 to swing, and a bucket 32 attached to the leading end of boom 31 in such a manner that allows bucket 32 to swing. Front frame 5 and boom 31 are coupled together by a pair of boom cylinders 33, 33. Boom cylinders 33, 33 are extended and shortened to allow boom 31 to swing.

Operating machine 30 also includes: a bell crank 34 supported, at a substantially central position of the operating machine, on boom 31 in such a manner that allows bell crank 34 to swing; a bucket cylinder 35 coupling the base end of bell crank 34 and front frame 5 together; and a link 36 coupling the leading end of bell crank 34 and bucket 32 together. Bucket cylinder 35 is extended and shortened to allow bucket 32 to swing.

In a rear portion of rear body 2, an engine room 2b is disposed. On the front side with respect to engine room 2b, a hydraulic oil tank 2a is disposed. A cab 10 is provided on the front side with respect to hydraulic oil tank 2a for accommodating an operator so that the operator in the cab can operate wheel loader 1.

Next, a description will be given, using FIGS. 2 and 3, of a configuration of a cab for a construction machine according to an embodiment of the present invention, specifically a cab used for the wheel loader of FIG. 1.

Figure 2:
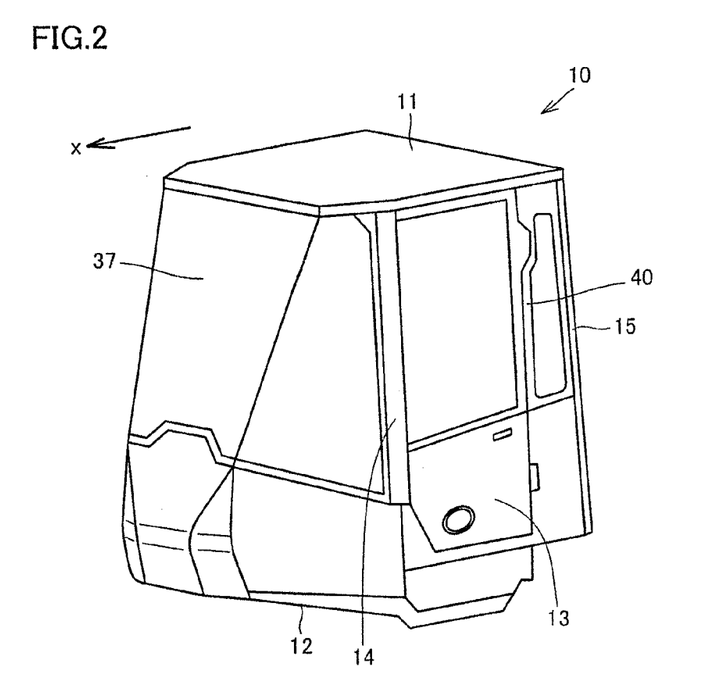
FIG. 2 is a perspective view schematically illustrating a configuration of a cab according to an embodiment of the present invention.
Figure 3:
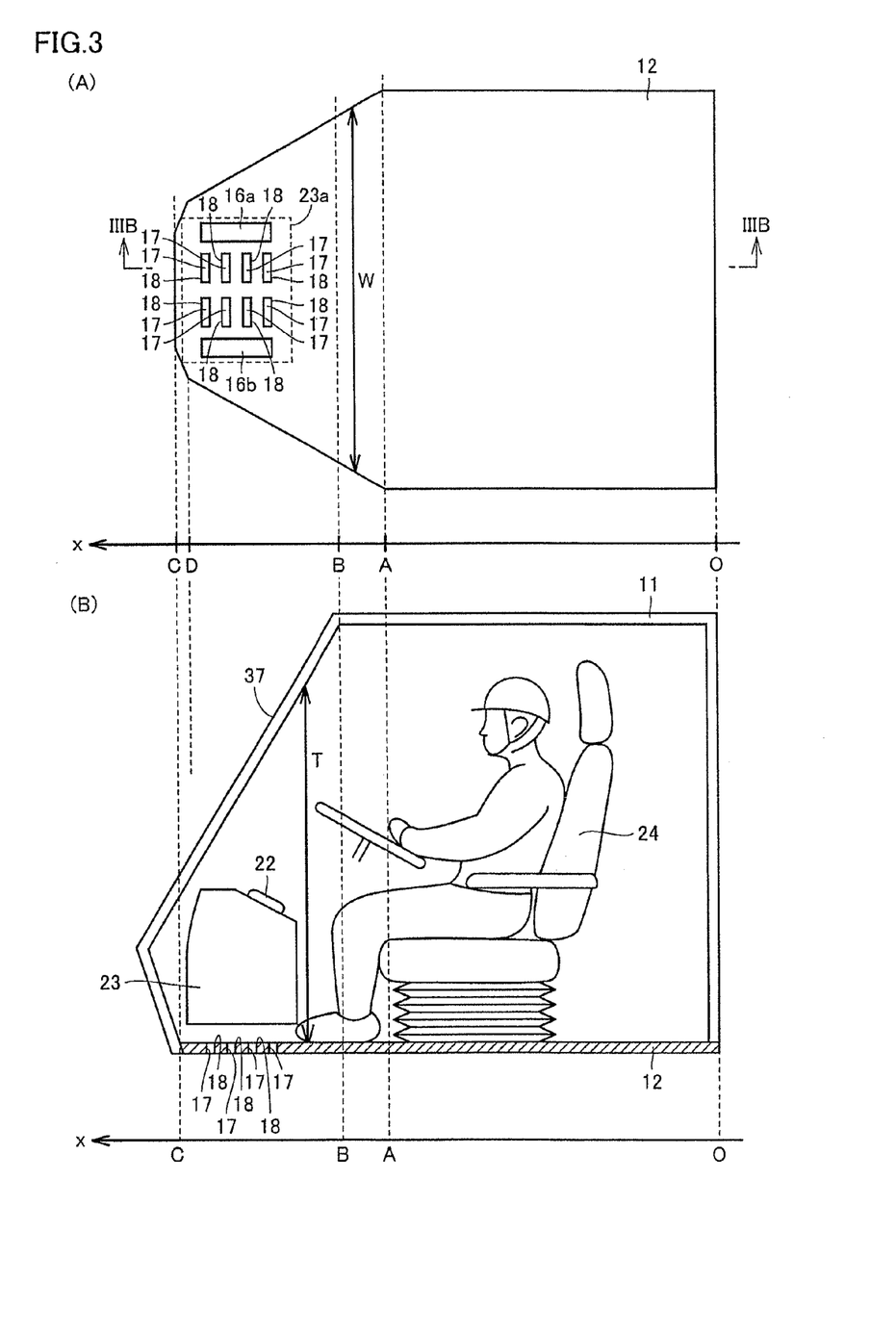
FIG. 3 shows a plan view (A) and a partial cross-sectional view (B) schematically illustrating the configuration of the cab according to an embodiment of the present invention.

Referring to FIGS. 2 and 3, cab 10 of the present embodiment mainly includes a floor plate 12, a roof 11, a front window 37, a door 13, a pair of front pillars 14, 14, a pair of center pillars 40, 40, a pair of rear pillars 15, 15, a driver's seat 24, and an air conditioner 23.

Between front pillar 14 and center pillar 40, door 13 is disposed for allowing an operator to enter and exit cab 10. Cab 10 has an internal space enclosed by floor plate 12, roof 11, front window 37, door 13, and other wall portions. In this internal space, driver's seat 24 for an operator to sit, and air conditioner 23 are disposed.

Referring to FIG. 3 (A), floor plate 12 has an octagonal shape for example as seen in a plan view. Floor plate 12 forms the floor of cab 10. Floor plate 12 includes, as seen in a plan view, a tapered portion (the portion from position A to position C) on the front side with respect to an operator sitting on driver's seat 24. The tapered portion has a dimension W in the direction of width that narrows toward the front. Floor plate 12 also includes, as seen in a plan view, a rectangular portion (the portion from position A to position O) in the shape of a rectangle on the rear side with respect to the operator. It should be noted that the tapered portion includes a portion in the shape of a trapezoid with two parallel sides (the portion from position A to position D). Here, the front refers to the direction x as shown in FIG. 3 (B) in which an operator sitting on driver's seat 24 faces. The front also refers to the side on which bucket 32 of the construction machine is disposed with respect to cab 10 as shown in FIG. 1. In the present embodiment, dimension W in the width direction of floor plate 12 narrows in two steps. Specifically, regarding cab 10 of the present embodiment, dimension W in the width direction narrows from position A to position D at a constant rate "a" and further narrows from position D to position C at a greater rate "b" than the aforementioned rate "a".

Referring to FIG. 3 (B), air conditioner 23 is disposed on the lower front side in cab 10. Air conditioner 23 operates for adjusting temperature, humidity and the like so that the inside of cab 10 in which an operator is working is kept comfortable. Air conditioner 23 also has an air outlet 22 communicating with the internal space of cab 10 for blowing air into cab 10. Accordingly, the pressure in the internal space of cab 10 is slightly higher than the pressure of the external space. Cab 10 in this state is called pressurized cab 10.

In floor plate 12 of a region of the tapered portion (the portion from position A to position C in FIG. 3 (A)), a through hole 17 is formed that connects the internal space and the external space of cab 10 to each other. An opening 18 refers to the end of through hole 17 that is exposed to the internal space.

As shown in FIG. 3 (B), cab 10 has a dimension T in the direction of height that decreases toward the front with respect to driver's seat 24 as seen in a side view. Specifically, dimension T in the height direction of cab 10 decreases from position B to position C. This region corresponds to the portion whose dimension T in the height direction decreases. Preferably, in a region (the portion from position B to position C in FIG. 3 (A)) of floor plate 12 of the portion whose dimension T in the height direction decreases, through hole 17 is formed.

Air conditioner 23 is disposed in the internal space of cab 10 and at a position opposite to through hole 17. While air conditioner 23 is disposed at a position opposite to through hole 17 in the present embodiment, it may also be a cab component other than air conditioner 23 that is disposed at a position opposite to through hole 17. A cab component here refers to a part disposed inside cab 10 and being a constituent part of the cab, and may for example be a console box or steering wheel support.

Air conditioner 23 (or cab component) is supported against floor plate 12 by support members 16a, 16b so that a gap is generated between air conditioner 23 and floor plate 12. As shown in FIG. 3 (A), air conditioner 23 is disposed at the position indicated by a dotted line 23a. Namely, air conditioner 23 is disposed so that it extends over two support members 16a, 16b and the space therebetween and covers opening 18.

Figure 8:
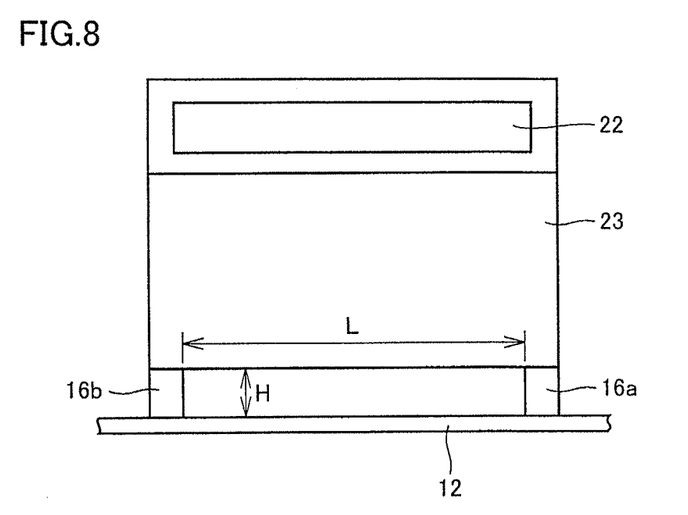
FIG. 8 is a diagram schematically illustrating a positional relation between the air conditioner, support members, and the floor plate according to an embodiment of the present invention.

Referring to FIG. 8, a relation between air conditioner 23, support members 16a, 16b, and floor plate 12 will be described.

As shown in FIG. 8, air conditioner 23 is supported by support members 16a, 16b so that a gap is generated between air conditioner 23 and floor plate 12. In the present embodiment, support members 16a, 16b are provided under air conditioner 23. Accordingly, the gap is formed that is surrounded by the bottom of air conditioner 23, floor plate 12, and a pair of support members 16a, 16b. Through this gap, through hole 17 communicates with the space where driver's seat 24 is disposed in cab 10.

The area of the entrance of the gap is calculated by H×L where H is the height of support members 16a, 16b and L is the distance from a sidewall of one support member 16a to a sidewall of the other support member 16b. Here, height H of support members 16a, 16b (namely the height of the gap) is 8 mm for example. In the case where the gap has a plurality of entrances, "the area of the entrance of the gap" herein refers to the total area of the multiple entrances.

Preferably, the area of opening 18 is equal to or larger than the area of the entrance of the gap. In the case where a plurality of openings 18 are provided, "the area of opening 18" herein refers to the total area of the multiple openings 18.

Figure 4:
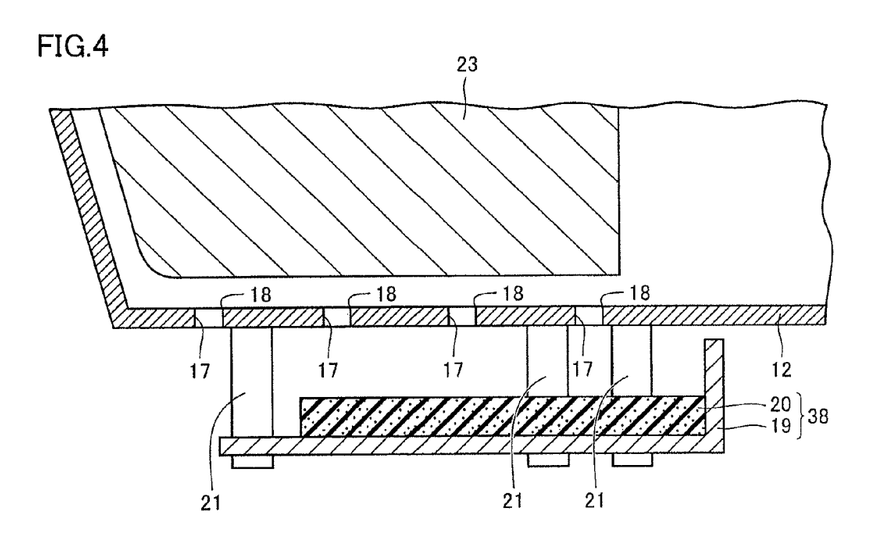
FIG. 4 is a partial cross-sectional view schematically illustrating a positional relation between an air conditioner, a floor plate and a cover member of the cab according to an embodiment of the present invention.
Figure 5:
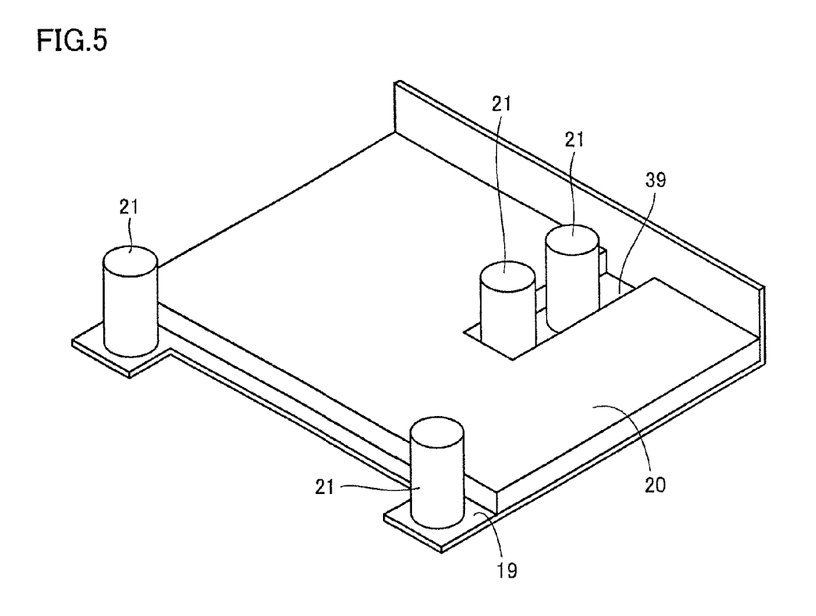
FIG. 5 is a perspective view schematically illustrating a configuration of the cover member of the cab according to an embodiment of the present invention.

Referring to FIGS. 4 and 5, a configuration of a cover member of cab 10 in the present embodiment will be described.

Cover member 38 includes a cover 19 and an acoustic member 20. Cover member 38 is disposed outside cab 10, spaced from the bottom side of cab 10, and placed at a position opposite to through hole 17. Cover member 38 is fixed by a fixing member 21 to floor plate 12. Acoustic member 20 is made for example from urethane resin. Acoustic member 20 is disposed between cover 19 and through hole 17.

As shown in FIG. 5, acoustic member 20 has a notch 39, and two fixing members 21 are disposed in this notch 39. Acoustic member 20 is provided so that it contacts cover 19.

Figure 6:
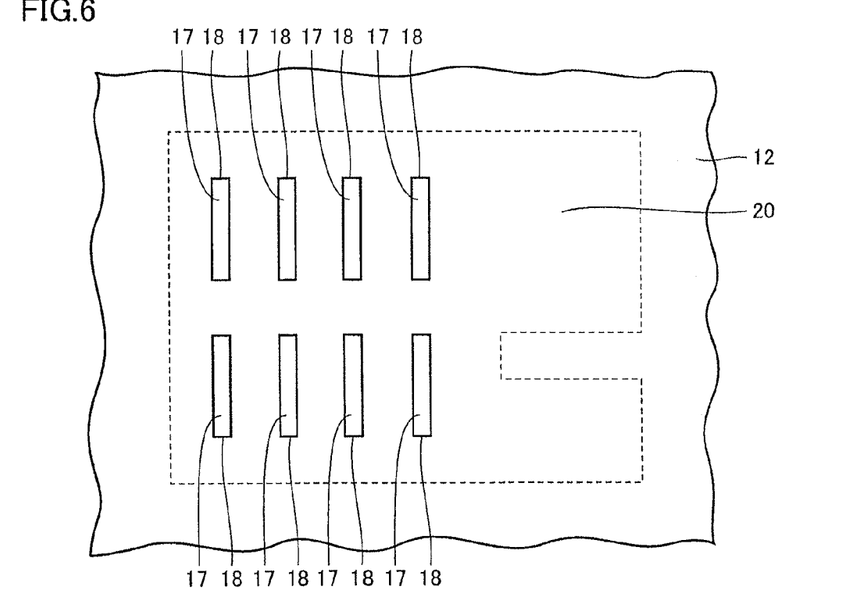
FIG. 6 is a diagram schematically illustrating a positional relation between an acoustic member and openings formed in the floor plate of the cab according to an embodiment of the present invention.

As shown in FIG. 6, acoustic member 20 is preferably disposed to cover the whole of a region directly below all through holes 17.

Figure 7:
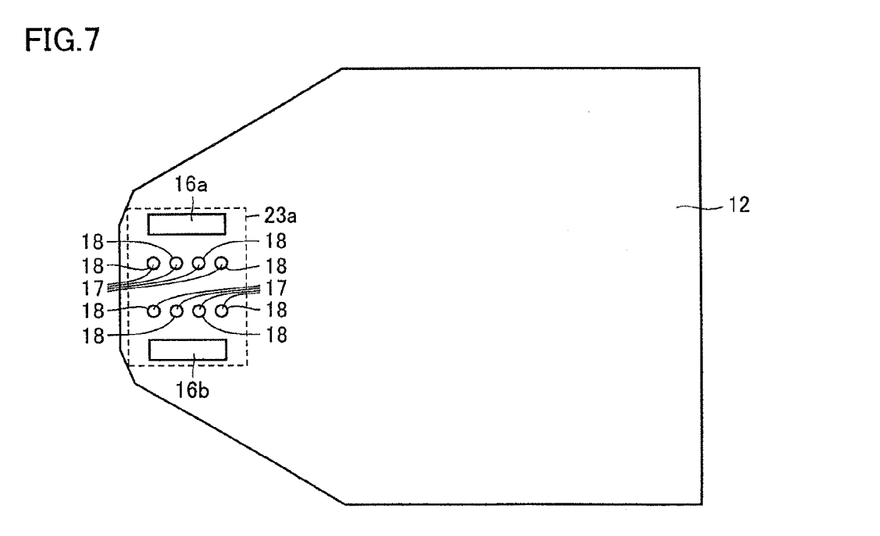
FIG. 7 is a diagram schematically illustrating a shape of openings formed in the floor plate of the cab according to an embodiment of the present invention.

Above-described opening 18 may at least be formed in the tapered portion of floor plate 12, and the shape, the number, and the arrangement of the opening are not particularly limited. For example, as shown in FIG. 7, opening 18 may have a circular shape. Moreover, a plurality of openings 18 may be provided at certain intervals. Furthermore, opening 18 may be provided between support members 16a, 16b of the pair of support members 16a, 16b. Alternatively, as shown in FIG. 3, the shape of opening 18 may be a rectangle, square, or polygon.

Preferably, through hole 17 is slit-shaped. Here, the slit is a shape having its longer side sufficiently larger in length than its shorter side. The shape of the slit may be a rectangle or may also be an ellipse. Preferably, a plurality of slits are provided. The number of slits is for example eight. A plurality of slits may be provided at certain intervals.

The slit has a length of its longer side of 65 mm for example and a length of its shorter side of 5 mm for example. The area of the slit is for example 325 mm$^2$ and the total area of a plurality of slits is for example 2600 mm$^2$.

Next, with reference to FIGS. 9 to 12, a pressure distribution in cab 10 after the door is closed will be described. In the drawings, the hatched portions on the left side represent pressure levels, and a hatched portion located relatively higher represents a higher pressure and a hatched portion located relatively lower represents a lower pressure. The same hatching patterns represent the same pressure levels.

Figure 9:
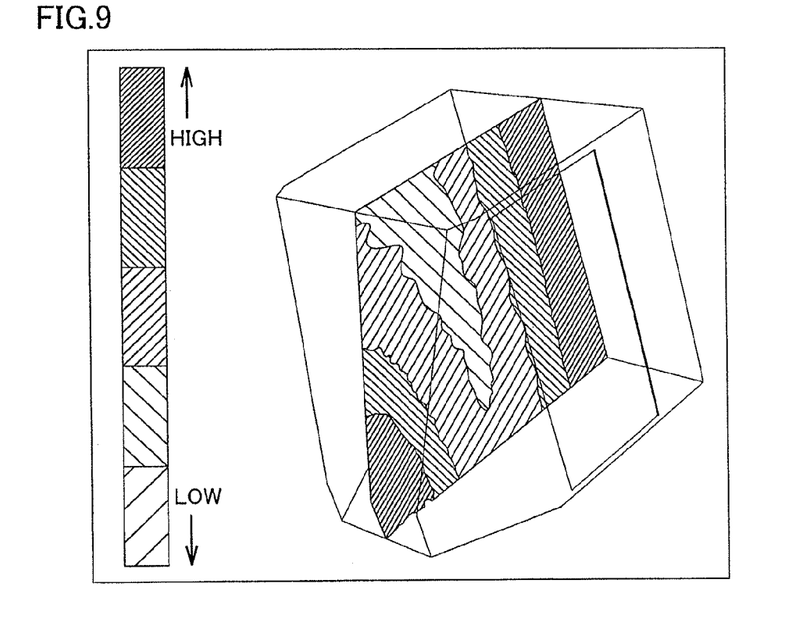
FIG. 9 is a diagram illustrating a pressure distribution inside the cab after a door is closed in the case where the cab has no cab component and no through hole.
Figure 10:
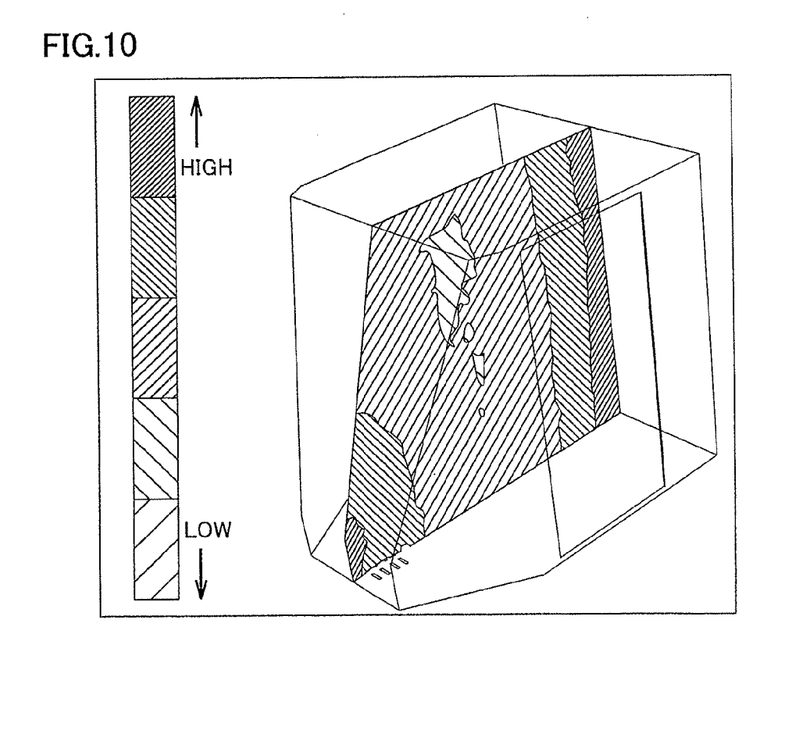
FIG. 10 is a diagram illustrating a pressure distribution inside the cab after a door is closed in the case where the cab has no cab component while it has through holes.

FIG. 9 is a diagram illustrating a pressure distribution of cab 10 for a construction machine in the case where the cab has no cab component and no through hole 17, and FIG. 10 is a diagram illustrating a pressure distribution of cab 10 for a construction machine in the case where the cab has no cab component while it has through hole 17. With reference to FIG. 9, it is seen that cab 10 which tapers toward the front has a higher pressure in its front tapered portion than the pressure in its non-tapered portion (central portion for example).

It is also seen from a comparison between FIG. 9 and FIG. 10 that the pressure in the front tapered portion of cab 10 in which the tapered portion has through hole 17 is lower than the pressure in the front tapered portion of cab 10 in which the tapered portion has no through hole 17. Namely, through hole 17 provided in floor plate 12 of the front tapered portion of cab 10 is considered as releasing a part of the air in cab 10 and accordingly the pressure inside cab 10 is lowered.

Figure 11:
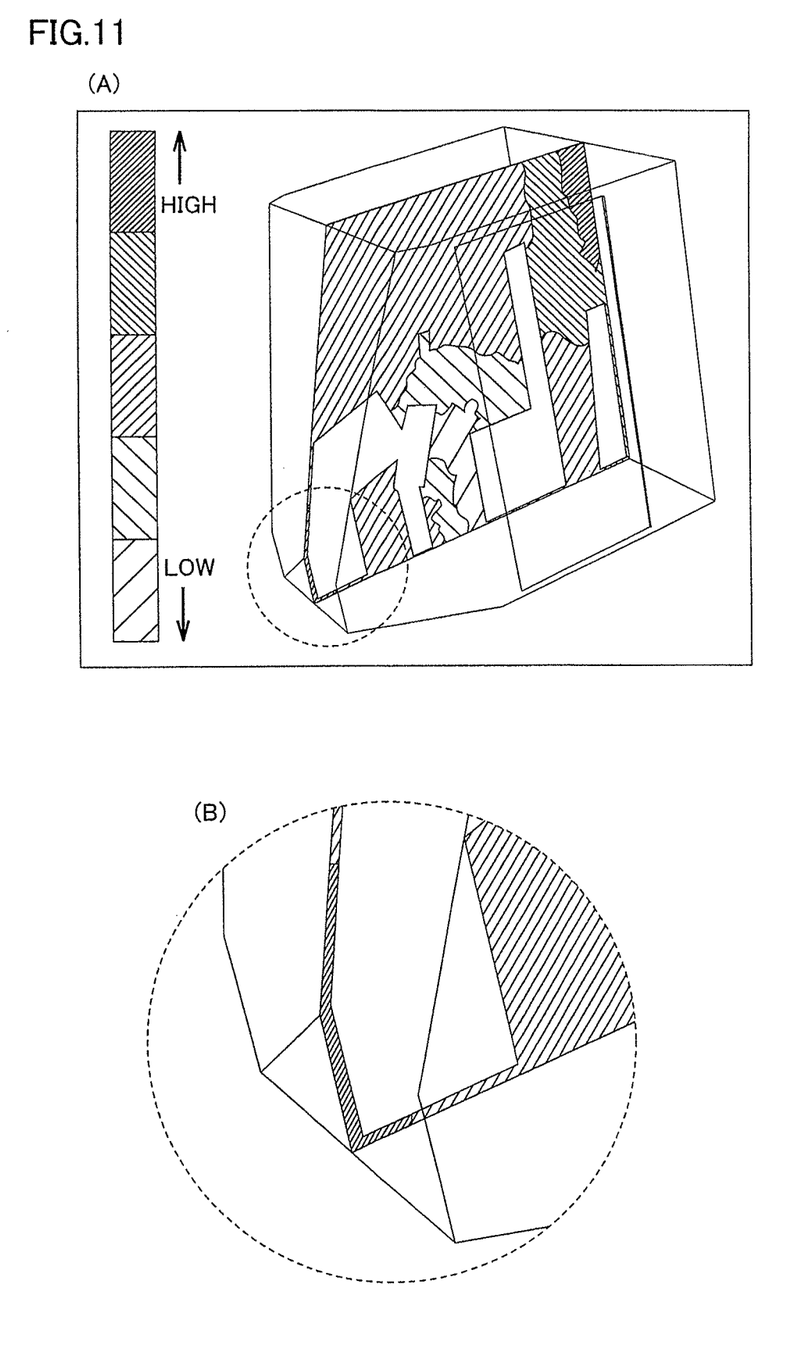
FIG. 11 shows a diagram (A) illustrating a pressure distribution inside the cab after a door is closed in the case where the cab has a cab component while it has no through hole, and an enlarged view (B) of a portion surrounded by a broken line in FIG. 11 (A).
Figure 12:
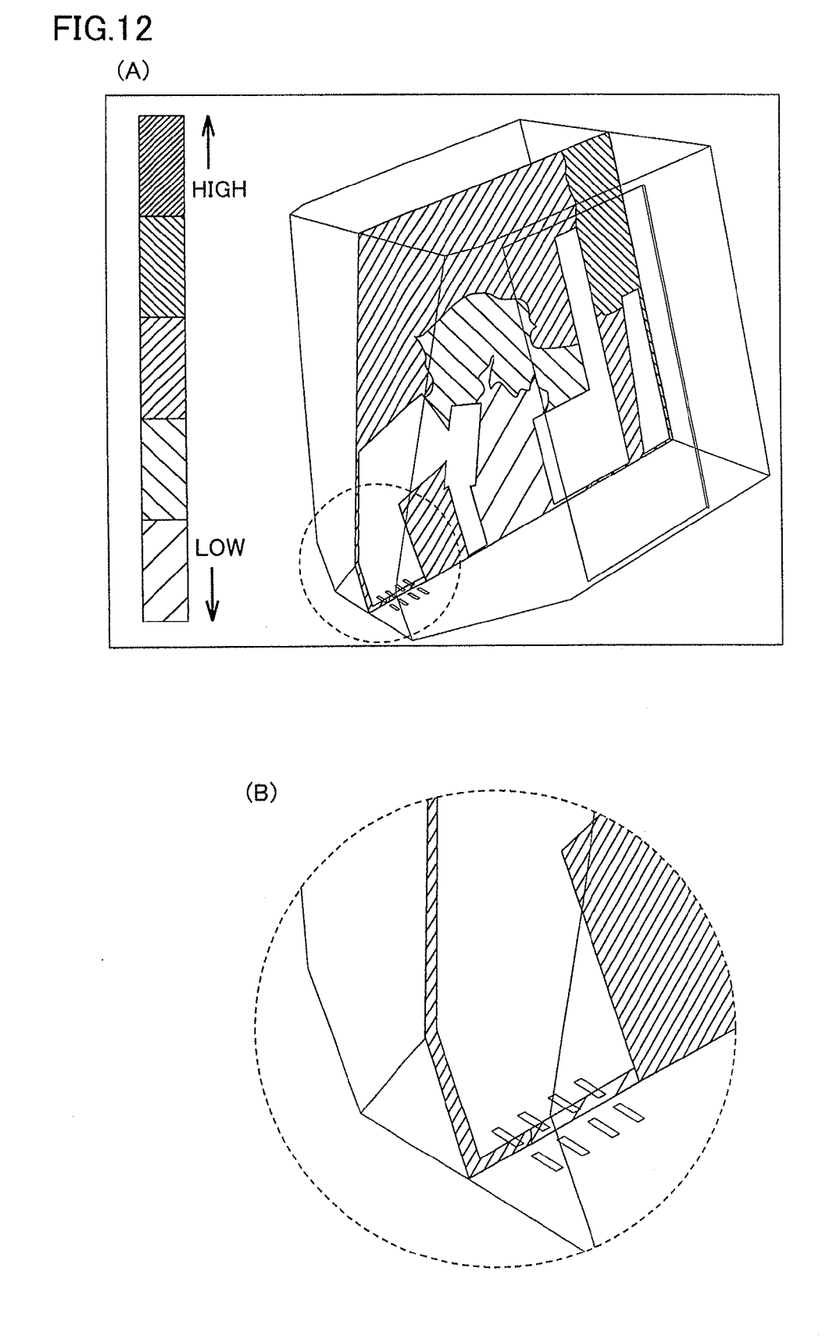
FIG. 12 shows a diagram (A) illustrating a pressure distribution inside the cab after a door is closed in the case where the cab has a cab component and through holes, and an enlarged view (B) of a portion surrounded by a broken line in FIG. 12 (A).

FIG. 11 is a diagram illustrating a pressure distribution of cab 10 for a construction machine in the case where the cab has the cab component while it has no through hole 17, and FIG. 12 is a diagram illustrating a pressure distribution of cab 10 for a construction machine in the case where the cab has the cab component and through hole 17. With reference to FIG. 11, it is seen that the pressure in the vicinity of the frontmost portion of cab 10 is higher than the pressures in other portions. It is the gap between the cab component and the wall of cab 10 that has a particularly higher pressure.

It is also seen from a comparison between FIG. 11 and FIG. 12 that the hatching pattern (see FIG. 12 (B)) of the front tapered portion of cab 10 in which the tapered portion has through hole 17 is sparser than the hatching pattern (see FIG. 11 (B)) of the front tapered portion of cab 10 in which the tapered portion has no through hole 17. Namely, this means that the pressure of the front tapered portion of cab 10 in which the tapered portion has through hole 17 is lower than the pressure of the front tapered portion of cab 10 in which the tapered portion has no through hole 17. Through hole 17 provided in floor plate 12 of the front tapered portion of cab 10 is considered as releasing a part of the air in cab 10 and accordingly the pressure inside cab 10 is lowered.

Next, the functions and effects of the present embodiment will be described.

Regarding cab 10 according to the present embodiment, in floor plate 12 of a region of the tapered portion as seen in a plan view as shown in FIG. 3 (A), through hole 17 that connects the internal space of cab 10 and the external space of the cab to each other is formed. Accordingly, the pressurized air in the internal space of cab 10 can effectively be released to the external space of cab 10 and therefore the pressure in cab 10 can be reduced.

Moreover, regarding cab 10 according to the present embodiment, through hole 17 is formed in floor plate 12 of a region of the tapered portion which is a portion whose dimension T in the height direction decreases toward the front as seen in a side view of cab 10 as shown in FIG. 3 (B). Accordingly, the pressure in cab 10 can more effectively be reduced.

Furthermore, regarding cab 10 of the present embodiment, a gap is generated between floor plate 12 and air conditioner 23 which is an example of the cab component as shown in FIG. 8, and air conditioner 23 is disposed at a position opposite to through hole 17. Since through hole 17 is formed opposite to the gap in which the pressure is likely to concentrate, the pressure in cab 10 can more effectively be reduced.

Furthermore, regarding cab 10 of the present embodiment, the area of opening 18 which opens to the internal space of cab 10 is equal to or larger than the area of the entrance of the gap surrounded by air conditioner 23, support members 16a, 16b, and floor plate 12. Therefore, the flow rate of the air discharged through opening 18 into the outside of the cab is higher than the flow rate of the air flowing through the entrance into the gap. Thus, the air in cab 10 can effectively be discharged to the outside of cab 10 without a pressure loss.

Furthermore, a plurality of slits are formed in floor plate 12 of cab 10 of the present embodiment, and therefore, the total area of through holes 17 can be increased without significantly decreasing the strength of floor plate 12.

Furthermore, cab 10 of the present embodiment further includes cover member 38 disposed in the external space of cab 10 and at a position opposite to through hole 17, and therefore, intrusion of noise outside cab 10 into cab 10 as well as intrusion of water and dust into the cab can be suppressed.

Furthermore, cab 10 of the present embodiment includes acoustic member 20 provided between cover 19 and through hole 17, and therefore, further reduction of noise inside cab 10 is achieved.

Furthermore, engine room 2b is provided on the rear side with respect to cab 10 of wheel loader 1. Since through hole 17 is provided in the front tapered portion of cab 10 and thus located relatively far from engine room 2b, intrusion of noise from engine 2b into cab 10 can be suppressed.

Figure 13:
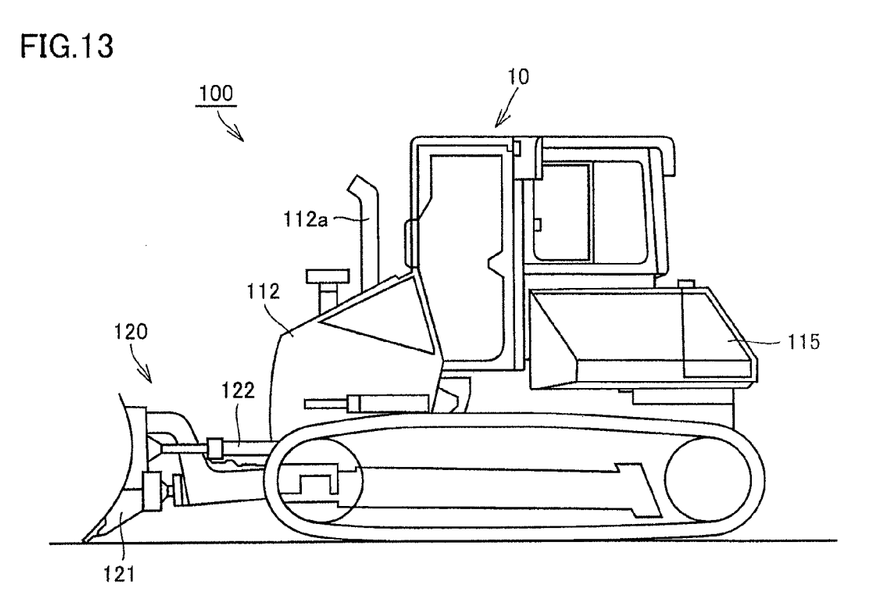
FIG. 13 is a side view schematically illustrating a structure of a bulldozer according to an embodiment of the present invention.

While the above description has been given concerning wheel loader 1, the present invention may be applied as well to a bulldozer 100. Referring to FIG. 13, bulldozer 100 which is a modification of the construction machinery of the present embodiment will be described.

Bulldozer 100 of the present embodiment mainly includes a nose module 112, a fuel tank 115, an operating apparatus 120, and a cab 10. Nose module 112 houses an engine therein. From nose module 112 upward, an exhaust pipe 112a is disposed. Operating apparatus 120 includes a blade 121 and an oil hydraulic cylinder 122. Oil hydraulic cylinder 122 extends and shortens to thereby enable blade 121 to tilt or move in a desired direction. Fuel tank 115 is a portion storing fuel to be supplied to the engine installed in nose module 112.

Cab 10 of the bulldozer is configured almost similarly to cab 10 of wheel loader 1, and includes, in cab 10, a driver's seat 24 for an operator to sit and a floor plate 12 forming the floor. Cab 10 of the bulldozer is shaped so that its front wall is substantially perpendicular to the ground as seen in a side view. In this respect, cab 10 of the bulldozer is significantly different from the cab of wheel loader 1. Namely, in a side view, the dimension in the height direction is constant toward the front with respect to driver's seat 24. However, floor plate 12 of cab 10 of bulldozer 100 includes a tapered portion shaped so that the dimension in the width direction narrows toward the front of cab 10 as seen in a plan view. Cab 10 of this bulldozer 100 also has a through hole 17 in the tapered portion of floor plate 12, similarly to above-described wheel loader 1, and accordingly can reduce the pressure in cab 10.

While the description herein has been given with reference to wheel loader 1 and bulldozer 100 as examples of the construction machinery, the present invention is not limited to them. Other examples of the construction machinery may include for example hydraulic shovel and crane.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is applicable particularly advantageously to cabs for working vehicles.

REFERENCE SIGNS LIST 1 wheel loader; 2 rear body; 2a hydraulic oil tank; 2b engine room; 3a front wheel; 3b rear wheel; 5 front frame; 10 cab; 11 roof; 12 floor plate; 13 door; 14 front pillar; 15 rear pillar; 16a, 16b support member; 17 through hole; 18 opening; 19 cover; 20 acoustic member; 21 fixing member; 22 air outlet; 23 air conditioner; 23a dotted line; 30 operating machine; 31 boom; 32 bucket; 33 boom cylinder; 34 bell crank; 35 bucket cylinder; 36 link; 37 front window; 38 cover portion; 39 notch; 100 bulldozer; 112 nose module; 112a exhaust pipe; 115 fuel tank; 120 operating apparatus; 121 blade; 122 oil hydraulic cylinder

The invention claimed is:

1. A cab comprising:
   a driver's seat for an operator to sit and an air conditioner in an internal space of the cab; and
   a floor plate forming a floor, said floor plate including a tapered portion on a front side with respect to an operator sitting on said driver's seat and a rectangular portion on a rear side with respect to the operator as seen in a plan view, said tapered portion being in a tapered trapezoidal shape having two parallel sides and a dimension in a width direction decreasing frontward,
   a through hole being formed in said floor plate of a region of said tapered portion and connecting said internal space of said cab and an exterior of said cab to each other so that air in the internal space of the cab where the driver's seat is disposed is released to the exterior of the cab, wherein
   the cab is formed so that a dimension in a height direction decreases frontward as seen in a side view, and said through hole is formed in said floor plate of a region where the dimension in said height direction decreases,
   the air conditioner is disposed in said internal space of said cab at a position opposite to said through hole,
   a first support member and a second support member support said air conditioner so that a gap is generated between said air conditioner and said floor plate, a height of each of the first and second support members being less than a distance between the first and second support members, and an area of an opening of said through hole that opens to said internal space of said cab is equal to or larger than an area of an entrance of said gap that is surrounded by said air conditioner, said first and second support members, and said floor plate.

2. The cab according to claim 1, wherein said through hole includes a plurality of slits.

3. The cab according to claim 1, further comprising a cover member disposed in said exterior of said cab and at a position opposite to said through hole.

4. The cab according to claim 2, wherein said cover member includes a cover and an acoustic member provided between said cover and said through hole.

\* \* \* \* \*